Patented Sept. 1, 1936

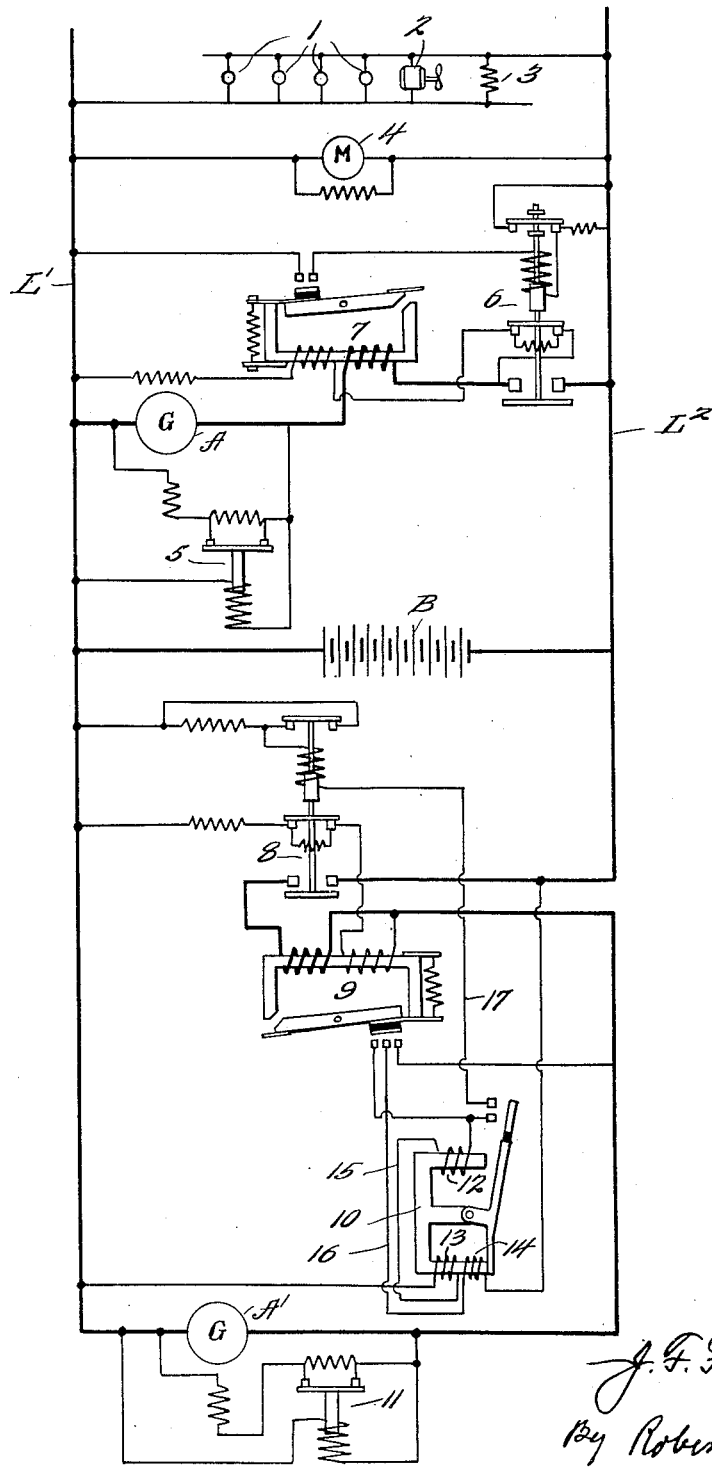

2,053,218

UNITED STATES PATENT OFFICE 2,053,218

REVERSE CURRENT RELAY LOCK-OUT

Joseph F. Frese, Baltimore, Md., assignor to Monitor Controller Company, Baltimore, Md., a corporation of Maryland Application March 2, 1935, Serial No. 9,092

5 Claims. (Cl. 171—313)

This invention relates to car lighting systems in which two or more generators driven from the car axles are employed to charge a battery supplying the lights and other auxiliary electrically operated devices of the system. The invention is particularly concerned with systems in which the usual constant voltage generator is used to charge the battery and where an additional generator is desirable to care for additional load such as air conditioning apparatus, heaters and other electrical devices requiring more current than can be supplied by the usual generator.

In car lighting systems such as that disclosed in the patent to J. F. Frese 1,973,804, September 18, 1934, a reverse current relay is employed to control a main contactor for closing the charging circuit. This device is entirely satisfactory where the battery is charged from a single generator. Where however another generator connected to another car axle is connected to the battery, and the voltage regulators of the generators may not be set the same, interference between the reverse current relays may occur. One generator may be charging the battery at a voltage such that when the second generator cuts in its reverse current relay will immediately open and this operation will be repeated so long as this condition exists. It is an object of this invention to provide means for overcoming this difficulty.

The drawing shows a wiring diagram of a car lighting system involving the invention.

Referring to the drawing the battery B is shown connected to leads $L_1$, $L_2$, across which are connected the load circuits of a car system such as lamps 1, fans 2, heaters 3 and a motor load as indicated at 4. These various devices are supplied from the battery B when the car is standing still. The generator A provided with a voltage regulator 5 is connected to the battery through main contactor 6 which is controlled by the reverse current relay 7. This relay and contactor are similar in construction and operation to the corresponding devices disclosed in Patent 1,973,804 referred to above and the system so far described operates in a similar manner.

To accomplish the purpose of this invention a second generator A' is shown connected to lead $L_1$ and to be connected to lead $L_2$ by means of contactor 8, controlled by reverse current relay 9, which are similar to contactor 6 and reverse current relay 7, and which are controlled by lock-out relay 10. Generator A' is driven from a car axle and is provided with a voltage regulator 11.

The function of the lock-out relay 10 is to prevent closure of contactor 8 when reverse current relay 9 closes if the battery is being charged by generator A at a voltage higher than the cut-in voltage of generator A'. If this condition exists when reverse current relay 9 closes relay 10 will be locked open and contactor 8 cannot operate.

Lock-out relay 10 is provided with three coils, closing coil 12, holding coil 13 and lock-out coil 14. Assuming that generator A is charging the battery at a voltage not higher than the cut-in voltage of generator A' the operation will be as follows: When generator A' reaches its cut-in voltage reverse current relay 9 will close circuit 15 including coils 12 and 13 in series and circuit 16 including lock-out coil 14. Coil 14 is connected in series between generator A' and the battery and under the condition assumed is energized from generator A' and is so wound as to oppose coil 13 so that closing coil 12 closes circuit 17 energizing contactor 8 which connects generator A' to the battery. If the voltage of generator A' is reduced below a predetermined value reverse current relay 9 will open circuits 15, 16 and 17, and generator A' cannot be again connected to the battery until the previous conditions exist. Coils 12 and 13 are shown connected in series though they may be connected in parallel and operated the same way. Coil 12 is usually stronger than coil 13 so that the lock-out relay will close if the conditions are correct even though very little current flows through coil 14 when reverse current relay 9 closes.

In the case where generator A is charging at a voltage higher than the cut-in voltage of generator A', the operation is as follows: When generator A' reaches its cut-in voltage reverse current relay 9 will close circuits 15 and 16 as before but coil 14 will assist coil 13 in opposing the pull of coil 12 to close the lock-out relay and contactor 8 will not be energized. Coil 14 now receives current from generator A and its relation to coil 13 is reversed.

The operation of the lock-out relay has been described in connection with generator A' assuming that generator A may at times be operating at a higher charging voltage. It will be understood however that this device may be applied to generator A also, so that it would be locked out if A' were charging at a voltage higher than its cut-in voltage. It is known that voltage regulators vary considerably from maintaining a constant value and that both regulators may not be set for exactly the same voltage. Under such conditions if one generator is charging at a too high voltage when the other cuts in the reverse current relay will close and open the contactor continuously and do it serious damage. If the reverse current relay closes the charging circuit directly the same objection arises. By the provision of the lock-out relay as disclosed this objectionable interference is avoided.

What I claim is:

1. In a train lighting system, in combination, a storage battery, a work circuit connected to said battery, a main generator for charging said battery, an auxiliary generator for charging said battery and supplying said work circuit, a main switch for connecting said auxiliary generator to said battery, a reverse current relay responsive to a predetermined voltage of the auxiliary generator for controlling said main switch and a lock-out relay responsive to a difference in voltage of the generators for preventing operation of the main switch while the voltage of the main generator is higher than that of the auxiliary generator.

2. In a train lighting system, in combination, a storage battery and work circuit, a variable speed constant voltage main generator for charging said battery, an auxiliary variable speed constant voltage generator for charging said battery and supplying said load circuit, a main switch for connecting said auxiliary generator to said battery, a lock-out relay responsive to difference in voltage of said generators for controlling said main switch and a reverse current relay responsive to the voltage of the auxiliary generator for controlling the lock-out relay.

3. In a train lighting system, in combination, a storage battery and work circuit, a variable speed constant voltage main generator for charging said battery, an auxiliary variable speed constant voltage generator for charging said battery and supplying said load circuit, a main switch for connecting said auxiliary generator to said battery, a lock-out relay for controlling said main switch, said relay having a closing and a holding coil and a lock-out coil, and a reverse current relay responsive to the voltage of the auxiliary generator for energizing the closing and holding coils and connecting the lock-out coil in series between the generators.

4. In a train lighting system, in combination, a battery and work circuit, a pair of variable speed constant voltage generators for charging said battery and supplying said work circuit, automatic means, comprising a reverse current relay and a main switch controlled thereby associated with each generator, for connecting said generators to said battery, and means, operative when one generator is charging, responsive to a difference in voltage of the generators for preventing the automatic means from connecting the second generator to the battery if the voltage of the charging generator is higher than the cut-in voltage of the second generator.

5. In a train lighting system, in combination, a storage battery and work circuit, a main generator, automatic means for connecting said generator to charge said battery, an auxiliary generator, a main switch for connecting said auxiliary generator to charge said battery, a lock-out relay for controlling said main switch, a reverse current relay, said lock-out relay having a core provided with a closing and a holding coil and a lock-out coil, said reverse current relay operative at a predetermined voltage of said auxiliary generator for connecting said closing and holding coils in shunt with said auxiliary generator and said lock-out coil in shunt with said main switch.

JOSEPH F. FRESE.